(12) United States Patent
Takechi

(10) Patent No.: US 10,056,977 B2
(45) Date of Patent: Aug. 21, 2018

(54) METHOD OF MEASURING FREQUENCY RESPONSE OF OPTICAL COHERENT RECEIVER

(71) Applicant: Sumitomo Electric Industries, Ltd., Osaka-shi (JP)

(72) Inventor: Masaru Takechi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/698,104

(22) Filed: Sep. 7, 2017

(65) Prior Publication Data

US 2018/0069624 A1    Mar. 8, 2018

(30) Foreign Application Priority Data

Sep. 7, 2016 (JP) ................................ 2016-174707

(51) Int. Cl.
*H04B 10/079* (2013.01)
*H04B 10/61* (2013.01)
*H04L 25/03* (2006.01)

(52) U.S. Cl.
CPC ......... *H04B 10/0795* (2013.01); *H04B 10/61* (2013.01); *H04L 25/03006* (2013.01)

(58) Field of Classification Search
CPC .............. H04B 10/0795; H04B 10/061; H04L 25/03006
USPC ........................................................ 398/25
See application file for complete search history.

(56) References Cited

U.S. PATENT DOCUMENTS

| 5,319,438 A * | 6/1994 | Kiasaleh ................ H04B 10/61 250/227.27 |
| 5,323,258 A * | 6/1994 | Tsushima ............... H04B 10/61 398/152 |
| 8,503,070 B1 * | 8/2013 | Henry ................... H01S 3/2383 359/337 |
| 2009/0214226 A1 * | 8/2009 | Mizuguchi ........... H04B 10/677 398/202 |

(Continued)

FOREIGN PATENT DOCUMENTS

| JP | 2008-048150 A | 2/2008 |
| JP | 2017-098751 A | 6/2017 |

OTHER PUBLICATIONS

Optical Internetworking Forum, "Implementation Agreement for Integrated Dual Polarization Intradyne Coherent Receivers," IA # OIF-DPC-RX-01.2, dated Nov. 14, 2013, pp. 1-25.

*Primary Examiner* — Dalzid Singh
(74) *Attorney, Agent, or Firm* — Venable LLP; Michael A. Sartori; Miguel A. Lopez

(57) ABSTRACT

A technique for measuring an optical coherent receiver is disclosed, where the optical coherent receiver recovers a data by an interference between signal light and local light. The technique includes steps of (i) equalizing optical lengths of the signal light and the local light from the optical source, respectively, and (ii) during a scan of the frequency, maximizing an output of the optical coherent receiver by the feedback control from an output of the optical coherent receive to the phase of the local light. The technique has a feature that, when the feedback control set a delay/lead in the phase of the local light to be $2V\pi - \Delta$, the delay/lead of the phase of the local light is decreased/increased by $2V\pi$, where $2V\pi$ corresponds to one period of the wavelength of the local light.

6 Claims, 2 Drawing Sheets

(56) References Cited

U.S. PATENT DOCUMENTS

2013/0070254 A1* 3/2013 Winzer .................. H04J 14/02
                                                                                                        356/478

* cited by examiner

METHOD OF MEASURING FREQUENCY RESPONSE OF OPTICAL COHERENT RECEIVER

BACKGROUND OF THE INVENTION

1. Field of the Invention

The present invention relates to a method of testing an optical coherent receiver, and a process of forming the optical coherent receiver.

2. Background Arts

An optical coherent system has been well known as a system able to transmit an enormous data with an extremely higher speed. A coherent receiver implemented within the optical coherent system extracts an optical signal by interfering signal light with local light with an optical 90° hybrid device and converts thus extracted optical signal into an electrical signal with a photo-detector. One of performances of the optical coherent receiver is frequency response of the photo-detector built-in the coherent receiver.

The frequency response of a coherent receiver becomes hard when the signal light in a phase thereof is aligned with a phase of the local light because an output of the interference depends on a phase difference between the signal light and the local light. Accordingly, an evaluation of the coherent receiver, in particular, frequency response thereof is necessary to feedback the phase difference between the signal light and the local light to a driving signal for a phase modulator. However, the driving signal for the phase modulator sometimes reaches an upper limit or a lower limit by the feedback, which becomes unable to control or adjust the phase difference.

SUMMARY OF INVENTION

An aspect of the present invention relates to a method of measuring frequency response of an optical coherent receiver. The coherent receiver of the present invention receives signal light and local light, and generates an output by interference between signal light and local light. The method includes steps of: (a) setting an optical length adjustor in a first optical path from an optical source to the coherent receiver, where the first optical path is provided for the signal light, and the optical length adjustor varies an optical length of the signal light; (b) setting an optical phase adjustor in a second optical path from the optical source to the optical coherent receiver, where the second optical path is provided for the local light, and the optical phase adjustor varies a phase of the local light by suppling a bias thereto; (c) by adjusting the optical length adjustor, equalizing an electrical length of the first optical path for the signal light with an electrical length of the second optical path for the local light under a condition where the bias supplied to the phase adjustor is set to be zero; and (c) maximizing the output of the coherent receiver by feed-backing the output of the coherent receiver to the bias supplied to the optical phase adjustor. A feature of the method is that the bias is decreased by $2V\pi$ when the bias reaches $2V\pi-\Delta$, or the bias is increased by $2V\pi$ when the bias reaches $-2V\pi+\Delta$, where $\Delta$ is a preset amount and $2V\pi$ corresponds to one period of a wavelength of the local light.

Another aspect of the present invention also relates to a method of measuring frequency response of the optical coherent receiver. The method includes steps of: (a) setting an optical phase adjustor in an optical path from the optical source to the optical coherent receiver, where the optical path is provided for the local light, and the optical phase adjustor varies a phase of the local light by supplying a bias thereto; (b) evaluating an initial bias supplied to the optical phase adjustor, where the initial bias equalizes the electrical length of the optical path for the local light with an electrical length of another optical path for the signal light that extends from the optical source to the coherent receiver; and (c) maximizing the output of the coherent receiver by feed-backing the output of the coherent receiver to the bias supplied to the optical phase adjustor. A feature of the method according to the other aspect is that the bias is increased by $2V\pi$ when the bias measured from the initial bias reaches $2V\pi-\Delta$, or decreased by $2V\pi$ when the bias from the initial bias reaches $2V\pi+\Delta$, where $\Delta$ is a preset amount and $2V\pi$ corresponds to one period of a wavelength of the local light.

BRIEF DESCRIPTION OF THE DRAWING

The invention will now be described by way of example only with reference to the accompanying drawings in which.

DESCRIPTION OF EMBODIMENT

Next, embodiment according to the present invention will be described as referring to drawings. In the description of the embodiment, numerals or symbols same with or similar to each other will refer to elements same with or similar to each other without duplicating explanation.

First Embodiment

Figure 1:
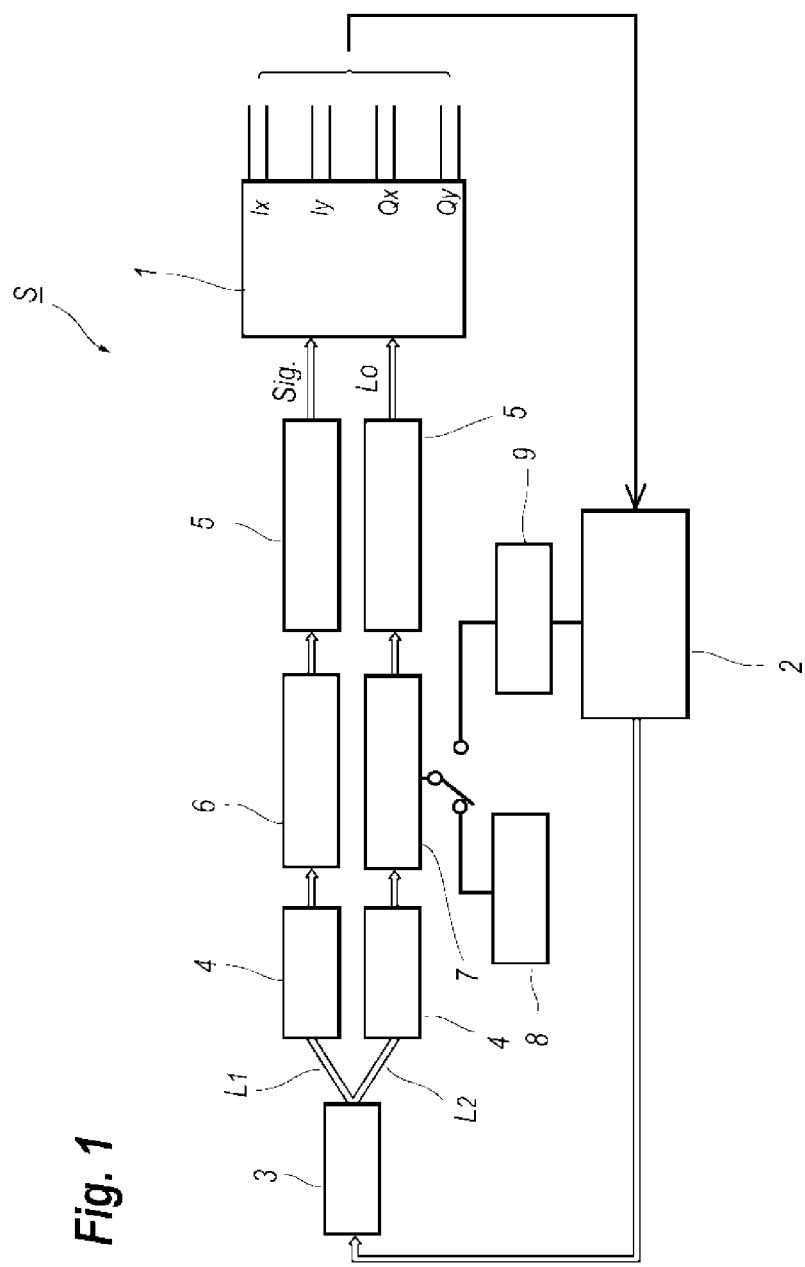
FIG. 1 shows a functional block diagram of a system for testing an optical coherent receiver.

FIG. 1 schematically illustrates a functional block diagram of a system S for measuring frequency response of a coherent receiver 1 according to the first embodiment of the present invention. In the system S, the coherent receiver 1, which receives signal light and local light, provides an optical path $L_1$ for the signal light and another optical path $L_2$ for the local light. Also, the system S provide an analyzer 2, which is often called as a lightwave component analyzer (LCA), an optical splitter 3, two optical attenuators 4, two polarization controllers 5, an optical length adjustor 6, an optical phase adjustor 7, an oscillator 8 and a bias source 9.

The LCA 2, which may builds in an optical source that superposes a radio frequency (RF) signal thereon, may generate an optical signal modulated with the RF signal. The LCA 2 optically couples with the optical splitter 3, while, the optical splitter 3 optically couples with two optical attenuators 4. The LCA 2, as described above, may generate the optical signal that is modulated by the RF signal in amplitude thereof, while, the optical splitter 3 splits this optical signal into two parts. The LCA 2 electrically receives an output of the coherent receiver 1.

One of the parts of the optical signal that is split by the optical splitter 3 enters the coherent receiver 1 transmitting through the optical attenuator 4, the optical length adjustor 6, and the polarization controller 5. The other part of the optical signal also enters the coherent receiver 1 but transmitting though the optical attenuator 4, the optical phase adjustor 7 and the polarization controller 5. The other optical signal is modulated in a phase thereof with a low frequency (LF) signal coming from the oscillator 8 at the optical phase adjustor 7, where the LF signal is not synchronized with the RF signal that modulates the amplitude of the optical signal. The bias source 9 is a type of a variable voltage source controlled by an output of the coherent receiver 1 through the LCA 2.

The polarization controllers 5 each vary the polarizations of the optical signal; specifically, one of the polarization controller 5 varies the polarization of the optical signal coming from the optical length adjustor 6, while the other of the polarization controller 5 varies the polarization of the optical signal coming from the optical phase adjustor 7. The optical length adjustor 6 may be a type of an optical delay line whose optical length may be manually or electrically varied.

The one of the optical signal output from the polarization controller 5 through the optical length adjustor 6 simulates the signal light, while, the other of the optical signal output from the polarization controller 5 through the optical phase adjustor 7 simulates the local light. The other of the optical signal simulating the local light is modulated in the phase thereof by the optical phase adjustor 7. However, the one of the optical signal simulating the signal light is not modulated in the phase thereof. The coherent receiver 1 may generate a differential signal for the one of the signal light by interfering with the other of the signal light. The coherent receiver 1 may generate an RF signal whose frequency coincides with the RF signal generated in the LCA 2 but the amplitude thereof depends on the interference between the two optical signals.

As described, the LCA 2 may generate the optical signal whose amplitude is modulated by an AC signal. The frequency response of the coherent receiver 1 corresponds to frequency response of four outputs, Ix, Iy, Qx, and Qy, for this AC modulating signal. The evaluation of the frequency response of the coherent receiver 1 may be carried out by inputting only the other of the optical signal simulating the local light into the coherent receiver 1 and by inputting only the one of the optical signal simulating the signal light into the coherent receiver 1. During the evaluation of the frequency response, the system does not adjust the optical length adjustor 6 and optical phase adjustor 7.

Carrying out the evaluation by inputting only the optical signal simulating the signal light, or only the optical signal simulating the local light, into the coherent receiver 1, one of performances called as the common-mode rejection ratio (CMRR) that is an index of reducing noises may be obtained for the respective outputs or channels, Ix, Iy, Qx, and Qy, where the respective channels have two photodiodes (PDs) connected in series between a bias supply and a ground.

When both of the signal light and the local light enter the coherent receiver 1, two PDs may receive two optical signals generated within an optical 90° hybrid and complementary to each other, and the coherent receiver 1 in the respective signal channels may output a signal corresponding to a difference between two optical signals complementary to each other. However, when only one of the signal light and the local light enters the coherent receiver 1, two optical signals generated by the optical 90° hybrid are not complementary to each other but become substantially same with each other in amplitudes and phases thereof. Accordingly, the differential signal between two outputs theoretically becomes zero. However, depending on dispersion of performances of the two PDs, optical signal paths in the coherent receiver 1, and so on, two signals practically show a substantial difference in a phase and amplitude thereof. Accordingly, the CMRR may be evaluated from the difference and the amplitude of the respective outputs of the two PDs for the respective channels independently.

When the optical paths, $L_1$ and $L_2$, show a substantial difference in electrical lengths thereof, beat components appear in the electrical output of the coherent receiver 1 depending on the difference in the electrical lengths as scanning frequencies of the RF signal, which makes hard or impossible to evaluate the frequency response of the respective signal channels. In order to equalize the electrical lengths of the respective optical paths, the method according to the present invention equalizes the optical lengths of the two optical paths, $L_1$ and $L_2$, by providing the optical length adjustor 6 in the optical path $L_1$ where the optical signal simulating the signal light passes. The optical length adjustor 6 may equalize the optical length in the optical path $L_1$ with the optical length of the other optical path $L_2$ where the optical signal simulating the local light Lo passes.

Next, a method of adjusting the optical length of the optical path $L_1$ will be described. First, the bias signal provided to the optical phase adjustor 7 is switched to the oscillator 8 that generates the LF signal not synchronized with the RF signal. The oscillator 8 may generate the LF signal whose waveform may be a triangle form, a saw-tooth form, a sine form, and so on, but a rectangular form is unsuitable. Any waveform continuously swinging between a maximum and a minimum may be applicable to the oscillator 8. Because of discontinuously crossing an average between the maximum and the minimum, the rectangular form is unsuitable for the measurement. The optical phase adjustor 7 may vary refractive index thereof by the electrical bias supplied thereto; accordingly, light passing therethrough may vary a phase thereof. A material having a large electrical to optical effect, for instance, lithium niobate ($NbLiO_3$) may be used as the optical phase adjustor 7. Scanning the frequency of the RF signal in the LCA 2 to, for instance, up to 40 GHz as providing the LF signal with amplitude of a few volts and a frequency of a few hertz, the frequency response of the respective signal channels of the coherent receiver 1 may be evaluated.

Figure 2:
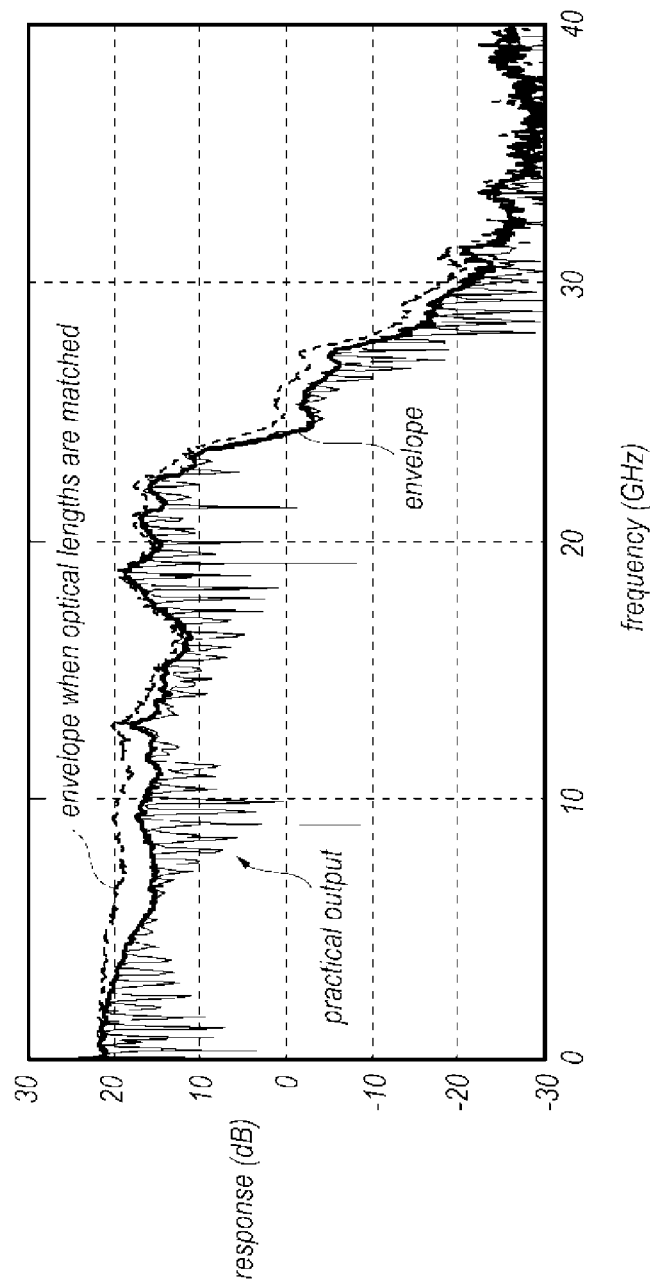
FIG. 2 exemplarily shows frequency response of the optical coherent receiver.

FIG. 2 shows an exemplary spectrum of the differential output of one signal channel of the coherent receiver 1 by the evaluation described above. A thin line in FIG. 2 corresponds to a practically measured response, while, a bold line shows an envelope of the measured response. A broken line corresponds to a status when the two optical paths equalize the optical lengths thereof; that is, two input signals, Sig. and Lo, equalize the electrical lengths thereof.

As shown in FIG. 2, many beats appear in the differential response following the phase modulating by the LF signal. The beats disappear around 6 GHz where the output of the channel becomes independent of the difference in the optical lengths. That is, the optical paths have a difference in the optical lengths thereof that corresponds to the frequency or one period of the wavelength at which the beats disappear. Increasing or decreasing the optical length for one of the optical paths, the optical paths have optical lengths, namely, electrical lengths substantially equal to each other. The optical length adjustor 6 may add an optical length corresponding to the frequency at which the beats disappear to the optical path $L_1$. Then, the system evaluates the frequency response again. When the frequency response still leaves beats, the optical length adjustor 6 decreases the optical length from the optical path $L_1$. Then, two optical paths for the signal light Sig. and the local light Lo have the optical lengths, namely, the electrical lengths, substantially equal to each other without the optical phase adjustor 7 receives no bias.

Thus, increasing or decreasing the optical length for the optical path $L_1$, two optical paths, $L_1$ and $L_2$, may have the optical length equal to each other. However, the optical lengths of the optical paths, $L_1$ and $L_2$, are sensitive for a temperature, mechanical vibration, and any other peripheral conditions, and preciseness of the physical length shorter than sub-micron meters is requested to be maintained during the singly frequency scan of the modulating signal. Accordingly, a feedback control for maximizing the differential output of the coherent receiver 1 becomes inevitable for the optical length of at least the optical path $L_2$ for the local light.

Switching the source of the bias signal for the optical phase adjustor 7 from the oscillator 8 to the bias source 9 that is controlled by the LCA 2. Then, the frequency scan to, for instance, 40 GHz is carried out as activating the feedback control from the output of the coherent receiver 1 to the optical phase adjustor 7 through the LCA 2 and the bias source 9 so as to set the output of the coherent receiver 1 to be maximum.

However, the output of the bias source 9 sometimes saturates during the frequency scan. A bias corresponding to one period ($2\pi$ radian) of the wavelength of the optical signal, which is often denoted as $2V\pi$ in the field, is several voltages. Depending on peripheral conditions, the optical length sometimes varies more than one period of the wavelength, which means that the bias becomes out of the range of $\pm 2V\pi$, for instance, falls within a range of $2V\pi \sim 4V\pi$, $4V\pi \sim 6V\pi$, . . . .

When the bias becomes out of the range $\pm 2V\pi$, the optical phase adjustor 7 is unable to be controlled adequately and resultantly the frequency response could not be measured. Resetting the bias source 9, an adequate phase delay/lead could not be set in the optical path $L_2$, which means that the measurement of the frequency response could not carried out until the feedback control for the bias source 9 sets an adequate bias therein.

The method according to the present invention varies the bias to the optical phase adjustor 7 by $2V\pi$ when the bias currently set in the bias source exceeds a critical level that is smaller than the a value $2v\pi$ corresponding to the one period of the wavelength of the signal light by a predetermined amount $\Delta$. That is, when the absolute of the bias signal reaches the value $2V\pi - \Delta$, the bias source 9 increases/decreases the bias by $2V\pi$. Even the optical phase adjustor 7 is varied in the bias thereof by $2V\pi$, the optical phase adjust 7 sets the delay/lead of the phase same with those before the change of the bias.

When the bias for the optical phase adjustor 7 is increased/decreased by $2V\pi$, the feedback control from the output of the coherent receiver 1 to the optical phase adjustor 7 promptly becomes stable because the phase delay/lead by the optical phase adjustor 7 that is changed by the bias is very close to or substantially same with the target phase delay/lead. Accordingly, an instable period during the scan of the frequency due to the unstable phase delay/lead may be shortened. It becomes necessary for the measurement of the frequency response according to the present invention to evaluate the value of $2V\pi$ that corresponds to the one period in the wavelength of the signal light, exactly, a value of the bias that causes the phase delay/lead in the optical phase adjustor 7, which corresponds to the one period of the wavelength of the signal light.

Second Embodiment

The system S of the first embodiment equalizes the optical lengths of the two optical paths, L1 and L2, provided with the optical length adjustor 6 and the optical phase adjustor 7, respectively, by setting the equivalent optical length of the optical length adjustor to be equal to an equivalent optical length of the optical phase adjustor 7 that is provided with a zero bias. The second embodiment according to the present invention replaces the optical length adjustor 6 in the first embodiment into an optical component that has the fixed equivalent optical length. One example of the optical component having the fixed optical length is a vacancy, that is, no optical component is set on the position where the optical length adjustor 6 is placed. Then, similar to the first embodiment, the frequency response of the coherent receiver 1, exactly, one channel of the coherent receiver 1 is measured by scanning the frequency as supplying an LF signal coming from the oscillator 8 to the optical phase adjustor 7. The output of the coherent receiver 1 shows many beats as shown in FIG. 2, but may indicate a specific bias at which the two optical paths, L1 and L2, in the optical lengths thereof become substantially equal to each other.

In the second embodiment, the bias source 9 varies the output thereof around the specific bias determined in advance to the practical scan of the frequency. That is, the feedback control from the output of the coherent receiver 1 to the bias source so as to maximize the output may be carried out around the specific bias. When an increment or a decrement of the bias thus performed with the feedback control reaches the critical level of $2V\pi - \Delta$, the system increases or decreases the bias by an amount corresponding to $2V\pi$. Thus, the two optical paths, L1 and L2, in the optical lengths thereof may be dynamically equalized.

The second embodiment becomes effective when the bias source 9 has an enough range. That is, even when the bias source 9 is set an offset as the specific bias and added with an additional bias by the feedback control to align the phases between the signal light and the local light, the bias source may leave an enough room until the saturation. On the other hand, when the specific bias is set to be large and the bias source shows a limited room for the saturation, the optical length adjustor 6 is effective to be set on the path $L_1$ for the signal light, and the bias source 9 may be varied around a zero bias by the feedback control.

While particular embodiment of the present invention have been described herein for purposes of illustration, many modifications and changes will become apparent to those skilled in the art. Accordingly, the appended claims are intended to encompass all such modifications and changes as fall within the true spirit and scope of this invention.

The present application claims the benefit of priority of Japanese Patent Application No. 2016-174707, filed on Sep. 7, 2016, which is incorporated herein by reference.

I claim:

1. A method of measuring frequency response of an optical coherent receiver that generates an output by interference between signal light and local light, the method comprising steps of:

setting an optical length adjustor in a first optical path from the optical source to the optical coherent receiver, the first optical path being provided for the signal light, the optical length adjustor varying an optical length of the signal light;

setting an optical phase adjustor in a second optical path from the optical source to the optical coherent receiver, the second optical path being provided for the local light, the optical phase adjustor varying a phase of the local light by suppling a bias thereto;

equalizing, by adjusting the optical length adjustor, an electrical length of the first optical path for the signal light with an electrical length of the second optical path for the local light under a condition where the bias supplied to the phase adjustor is set to be zero;

maximizing the output of the coherent receiver by feed-backing the output of the coherent receiver to the bias supplied to the optical phase adjustor, wherein the bias is decreased by $2V\pi$ when the bias reaches $2V\pi-\Delta$, or the bias is increased by $2V\pi$ when the bias reaches $-2V\pi+\Delta$, where $\Delta$ is a preset amount and $2V\pi$ corresponds to one period of a wavelength of the local light.

2. The method of claim 1, wherein step of equalizing the electrical length of the first optical path with the electrical length of the second optical path includes steps of, superposing a low frequency (LF) signal on the bias, measuring frequency response of the output of the coherent receiver, and obtaining a frequency at which a component of the LF signal disappear.

3. The method of claim 1, wherein the bias is varied in a range of $\pm 2V\pi$ around zero.

4. A method of measuring frequency response of an optical coherent receiver that generates an output by interference between signal light and local light, the method comprising steps of:

setting an optical phase adjustor in an optical path from the optical source to the optical coherent receiver, the optical path being provided for the local light, the optical phase adjustor varying a phase of the local light by supplying a bias thereto;

evaluating an initial bias supplied to the optical phase adjustor, the initial bias equalizing the electrical length of the optical path for the local light with an electrical length of another optical path for the signal light that extends from the optical source to the coherent receiver;

maximizing the output of the coherent receiver by feed-backing the output of the coherent receiver to the bias supplied to the optical phase adjustor, wherein the bias is increased by $2V\pi$ when the bias measured from the initial bias reaches $2V\pi-\Delta$, or decreased by $2V\pi$ when the bias measured from the initial bias reaches $2V\pi+\Delta$, where $\Delta$ is a preset amount and $2V\pi$ corresponds to one period of a wavelength of the local light.

5. The method of claim 4, wherein step of evaluating the initial bias includes steps of:

superposing a low frequency (LF) signal on the bias, measuring frequency response of the output of the coherent receiver, and obtaining a frequency at which a component of the LF signal disappear.

6. The method of claim 4, wherein the bias is varied in a range of $\pm 2V\pi$ around the initial bias.

* * * * *